No. 81,304. PATENTED AUG. 18, 1868.

T. P. SINK.
OYSTER DREDGE.

WITNESSES:
William Graf
Wm Runyan

INVENTOR:
Thomas P Sink

United States Patent Office.

THOMAS P. SINK, OF FAIRTON, NEW JERSEY.

Letters Patent No. 81,304, dated August 18, 1868.

IMPROVEMENT IN OYSTER-DREDGES.

*The Schedule referred to in these Letters Patent and making part of the same.*

TO ALL WHOM IT MAY CONCERN:

Be it known that I, THOMAS P. SINK, of Fairton, in the county of Cumberland, and State of New Jersey, have invented Improvements in Oyster-Dredges; and I do hereby declare the following to be a full and correct description of the same, reference being had to the accompanying drawings, in which—

Figure 1:
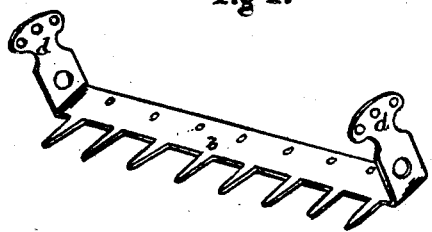
Figure 1 represents the dredge-rake, with clevis-ends.
Figure 2:
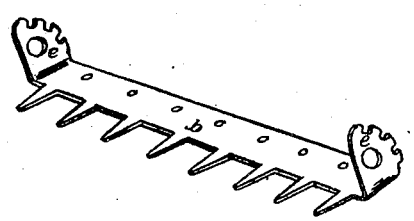
Figure 2 shows a dredge-rake, with ratchet-ends.
Figure 3:
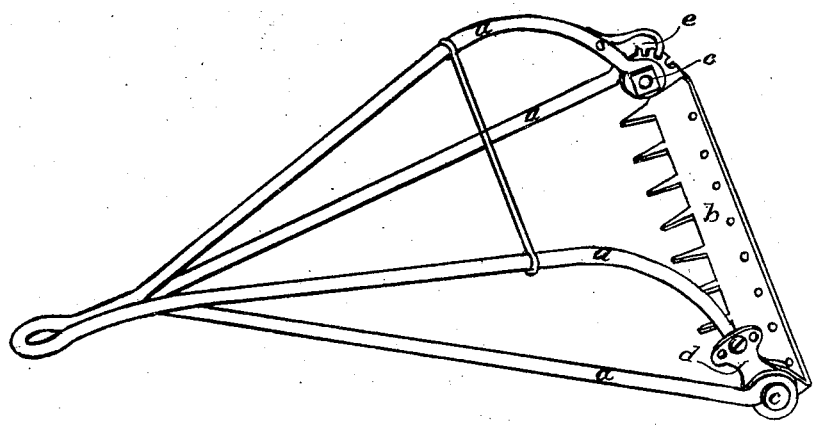

Figure 3, the dredge complete.

The nature of my invention consists in connecting each end of a dredge-rake with bolts or pivots to the dredge-frame, so that the rake can be adjusted and set to any pitch desired by the operator, and held fast in its position by a clevis or ratchet, as shown in the drawings at fig. 3.

The letter $a$ represents the dredge-frame.

Letter $b$, the rake.

Letter $c$, the bolts or pivots for the rake to hang upon.

Letter $d$, the clevis.

Letter $e$, the ratchet.

The object of this invention is to enable the oystermen to set their dredge-rake to the proper pitch required for either a hard or soft bottom, or it can be readily adjusted for repairs, or a new rake hung in its place, without going ashore to a blacksmith, at a great expense and loss of time, as heretofore.

What I claim as my invention, and desire to secure by Letters Patent, is—

The construction of an oyster-dredge with an adjustable rake, as herein described, and for the purpose set forth.

I also claim the clevis or ratchet, or its equivalent, in combination with an oyster-dredge, for the purpose of setting and keeping a dredge-rake to the proper pitch, as herein described, and for the purpose set forth.

The above specification of my said invention signed and witnessed at Philadelphia, this 19th day of May, A. D. 1868.

THOMAS P. SINK.

Witnesses:
W. OGLE,
WM. RUNYON.